Jan. 7, 1958 O. W. HENRIKSON ET AL 2,819,347

TELEPHONE DESK SET

Filed Oct. 5, 1954 4 Sheets-Sheet 1

*INVENTOR.*
OSCAR W. HENRIKSON
ROBERT L. SARGISSON
FREDRIC E. WOOD

*BY* Mc Walter Owen
ATTY.

Jan. 7, 1958 O. W. HENRIKSON ET AL 2,819,347

TELEPHONE DESK SET

Filed Oct. 5, 1954 4 Sheets-Sheet 2

INVENTOR.
OSCAR W. HENRIKSON
ROBERT L. SARGISSON
FREDRIC E. WOOD

BY Wm. Walter Devers

ATTY.

INVENTORS.
OSCAR W. HENRIKSON
ROBERT L. SARGISSON
BY FREDRIC E. WOOD
Mc Watters Owen
ATTY.

Jan. 7, 1958 O. W. HENRIKSON ET AL 2,819,347

TELEPHONE DESK SET

Filed Oct. 5, 1954

4 Sheets-Sheet 4

INVENTORS.
OSCAR W. HENRIKSON
ROBERT L. SARGISSON
FREDRIC E. WOOD
BY McWalter Caird
ATTY.

2,819,347

TELEPHONE DESK SET

Oscar W. Henrikson, Chicago, Robert L. Sargisson, Berwyn, and Fredric E. Wood, McHenry, Ill., assignors to General Telephone Laboratories, Incorporated, a corporation of Delaware Application October 5, 1954, Serial No. 460,474

7 Claims. (Cl. 179—100)

This invention relates to telephone desk sets, of the character adapted to hold a telephone handset in a cradle located on top of the desk stand.

A telephone desk set of the above-mentioned type comprises a casing or housing, having a cradle portion to receive the telephone handset and a pedestal portion integrally formed on a base portion. The pedestal portion comprisees two side walls extending upwardly from the base portion and terminating in tines to form the cradle. In desk sets of this type the handset is designed so that the receiver and transmitter housings are placed at the proper distance and angles to enable proper positioning of these housings with respect to the user's ear and mouth. The distance between the innermost portions of the receiver and transmitter housings on the handset limits the width of the cradle portion and the distance between the outside surfaces of the side walls of the pedestal. Plungers are provided within the pedestal side walls and cradle to operate the switchhook springs of the subset.

When in a hurry, people will often replace the handset improperly in or near the cradle. With desk sets of the prior art it frequently occurred that the handset would remain in the position to which it had been replaced, being caught in a position other than in the cradle, without engaging the plungers to activate the hookswitch springs. These involuntary off-hook positions deprived the subscriber of telephone service by making his telephone inaccessible to incoming calls.

The main object of the present invention is to provide surfaces on the telephone desk stand of such a form that they will cooperate with the surfaces of the handset to cause the handset to automatically seat itself in the cradle seat when it is improperly replaced at or near the front of the cradle seat.

A further object of the present invention is to provide means whereby the handset when improperly placed to the front of the cradle seat, will raise its handle portion over the front tines and cause it to drop into the cradle seat.

Other objects and features of this invention will be apparent from the following description of the drawings, comprising Figs. 1–6, which show sufficient views of the handset and desk stand to enable the invention to be described and understood.

Figure 1:
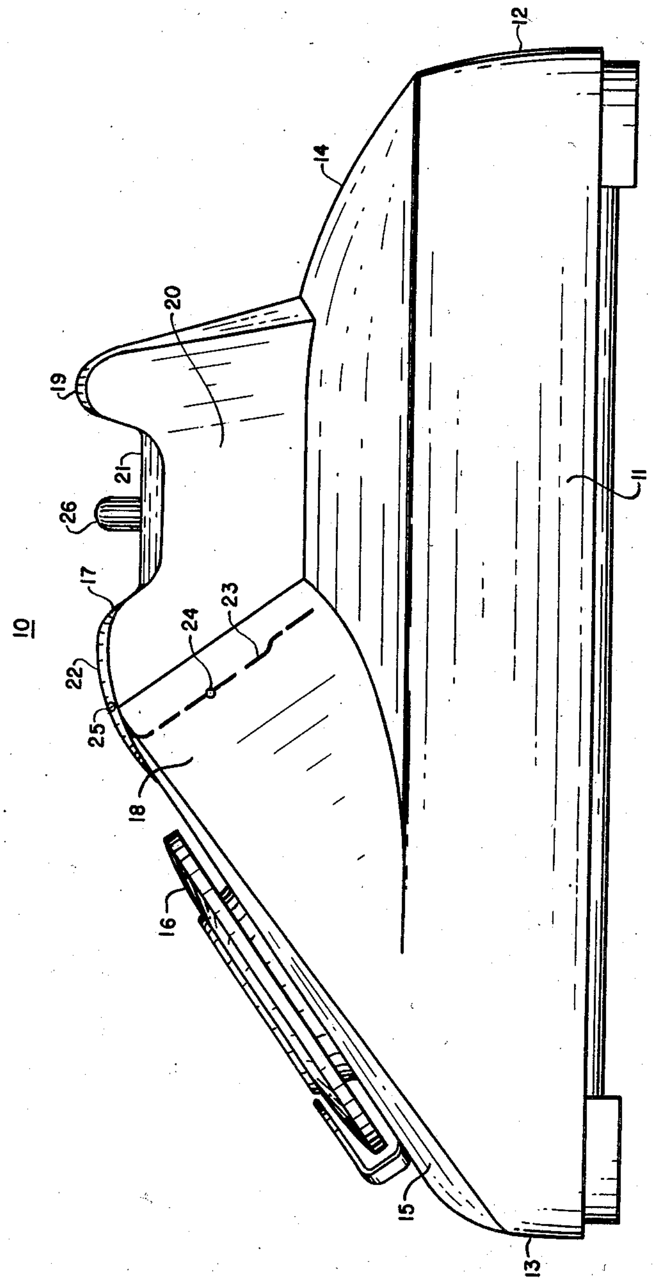
Fig. 1 is a view taken from the bottom side in Fig. 2 of the telephone desk stand showing the path of engagement of the receiver housing with the curved side surface during the restoring movement.
Figure 2:
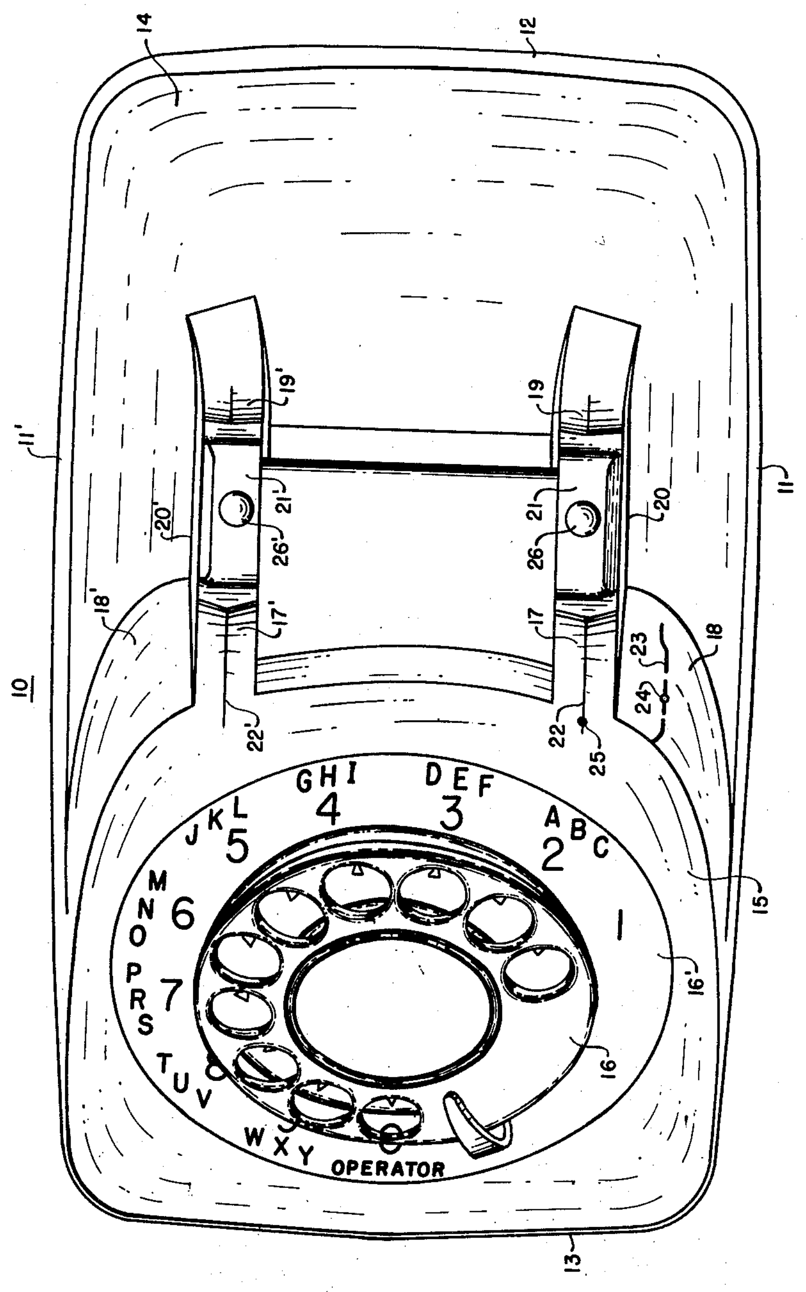
Fig. 2 is a top view of the telephone desk stand also showing the path of engagement of the receiver housing with the curved side surface.

Referring now in general to the drawings where like reference characters are used to designate like parts throughout. The casing or shell 10 of the desk telephone is formed in one piece of some suitable plastic compound. The base portion of the casing 10 comprises four sides or skirt walls 11, 11′, 12 and 13, which extend substantially vertically for a short distance at which point the rear and side surfaces 14 converge convexly as shown. The front surface 15, in which is flush mounted a dial 16 of the finger-wheel type with an extended number plate 16′, slopes upwardly and inwardly at an angle from the front skirt wall 13, and blends with the front tines 17 and 17′ of the cradle portion. These front tines have ridges 22 and 22′ along the top to reduce the frictional contact. Curved convex side walls 18 and 18′ extend from the front surface 15 and curve inwardly as shown until they meet the pedestal side walls 20 and 20′ at a predetermined angle. The pedestal side walls 20 and 20′ rise vertically from the surface 14 and terminate at their uppermost portion in tines 17, 17′, 19 and 19′ and in a lower horizontal portion to form the cradle seats 21 and 21′ through which project the hookswitch activating plungers 26 and 26′.

Figure 3:
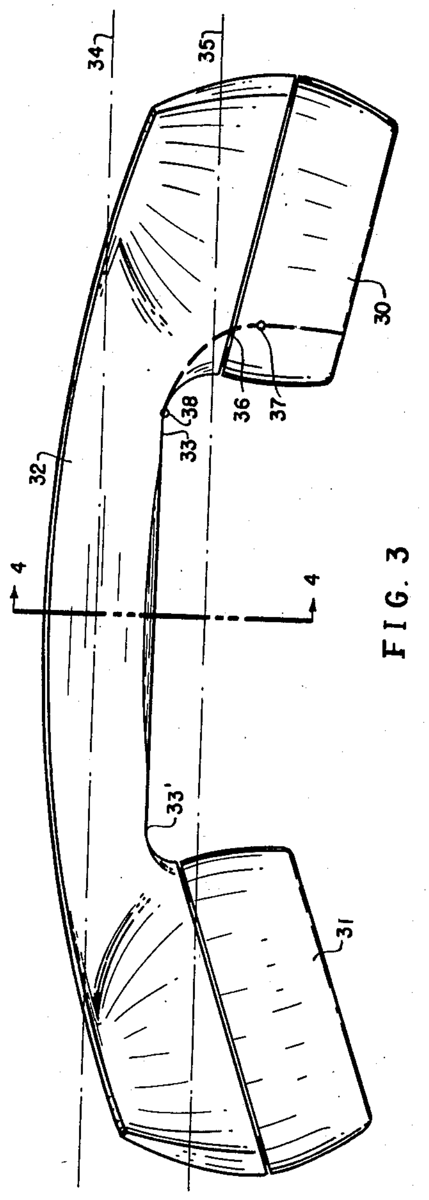
Fig. 3 is a front view of the handset showing its corresponding path of engagement with the desk stand during the restoring movement.
Figure 4:
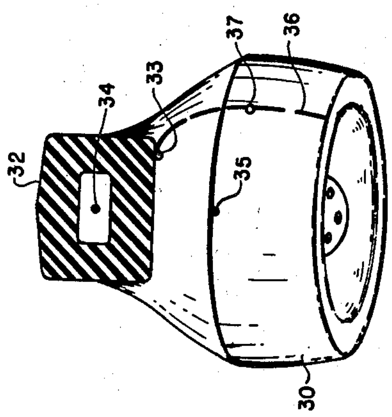
Fig. 4 is a view of the receiver end of the handset showing the corresponding path of engagement with the desk stand.

The handset shown in Figs. 3 and 4 is comprised of receiver and transmitter housings 30 and 31 respectively at the ends of the handle portion 32. The receiver and transmitter housings are positioned at an angle and separated a predetermined distance as shown. This enables the transmitter to be in a position for proper voice transmission when the receiver is held to the ear of the user. The handle portion 32 of the handset is quite light, while the transmitter and receiver housings 30 and 31 containing the transmitter and receiver units are comparatively heavy, whereby the line parallel to the center of the handle through which the center of gravity of the handset passes, designated by the line 35, is ⅞ of an inch away from the line 34 passing through the center of the handle. The handle also has two flattened surfaces 33 and 33′ near the ends of the handle to permit it to set in the cradle more firmly.

Figure 5:
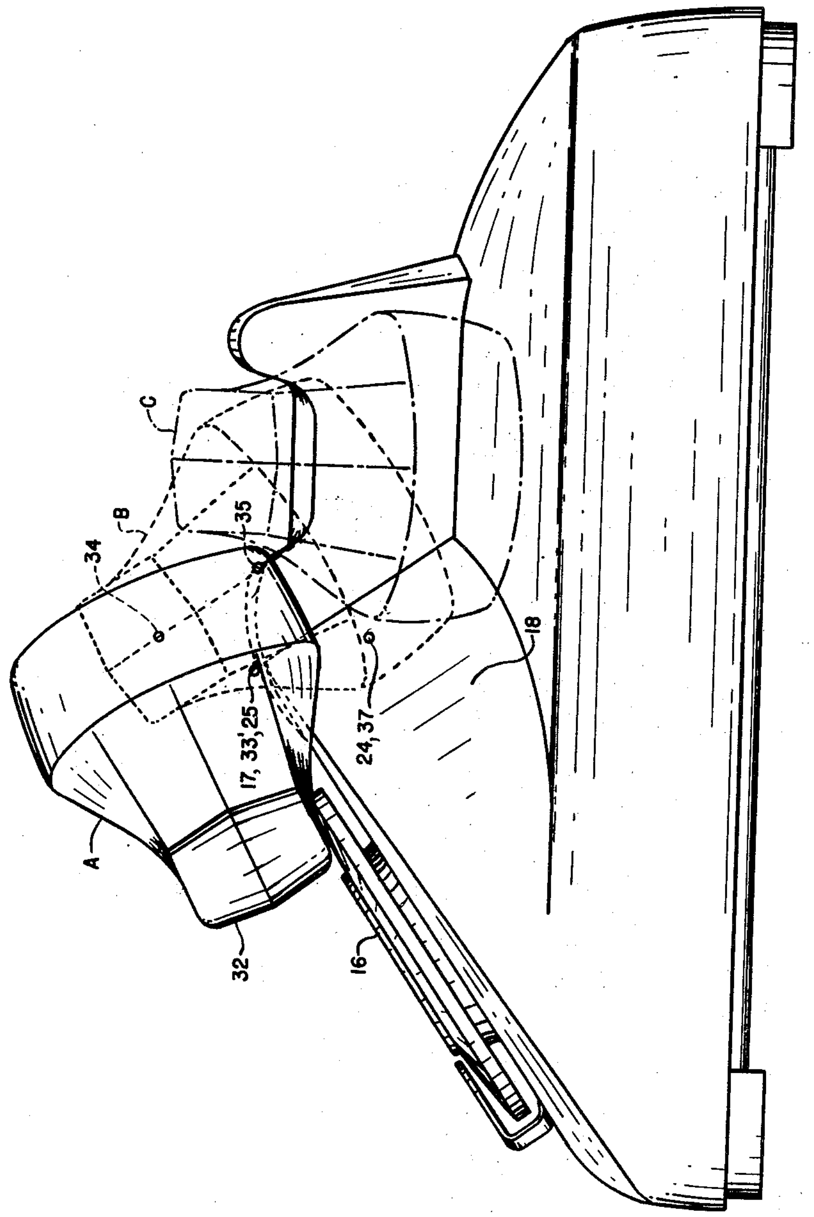
Fig. 5 is another view taken from the bottom of Fig. 2 of the desk stand with the handset shown in several of its positions while restoring.

Having given a general description of the casing and handset a detailed explanation will now be given of the means whereby the handset automatically seats itself when improperly replaced at or near the front of the cradle seat. For this purpose it will be assumed that the handset is improperly replaced on the casing in the position A shown in the full lines in Fig. 5 with the handle 32 touching the finger-wheel of the dial 16 and the transmitter and receiver housings engaging the convex curved side walls 18 and 18′. When the handset is improperly placed in this position, or in a position intermediate the positions A and B shown in Fig. 5 with the transmitter and receiver housings engaging the convex curved side walls 18 and 18′, the handset will automatically restore to the cradle seat. The location of the center of gravity of the handset and the weight of the handset causing the receiver and transmitter housings to engagingly slide down the convex curved side surfaces 18 and 18′ and the handle 32 to rotate up and over the front tines 17 and 17′ of the cradle and drop into the cradle seats 21 and 21′.

The path and points of contact of the handset's receiver housing during the restoring movement are alone described, the action path and points of contact of the transmitter housing are similar. The line 23 is the path along which the receiver housing slides while the handset is restoring itself to the cradle. The point 24 on this line is the point of engagement of the receiver housing when it is in position B of the handset shown by dotted lines in Fig. 5. The point 25 is the point at which the handset handle contacts the front tine 17 when the handset is in this position (B). A flat portion 33 of the bottom of the handle engages the ridge 22 of the tine 17 at point 38 (Figs. 3 and 4), while the line 36 designates the path along which the curved side surface 18 of the desk stand is engaged by the receiver housing. Point 37 on line 36 designates the point of engagement of its housing when the handset is in position B of Fig. 5.

The means whereby the handset restores itself to the cradle by lifting the handset handle up and over the front tines is the result of an ingenious combination of simple machine functions motivated by gravity, where the center of gravity of the handset is always falling even though the handle is rising. The primary motivating action of the handset is its slipping or sliding movement down the slope of the curved side surfaces 18 and 18' to move the transmitter 31 and receiver 30 housings toward their proper positions. However, this sliding motion is soon retarded by the handle 32 encountering the front tines 17 and 17'. To overcome this obstacle two basic machine principles are resorted to. One is that a force less than the weight of a body will suffice to draw the body up an appropriate incline and the other is the principle of a lever. These principles as applied to the desk stand and handset may be visualized when the parts corresponding to these simple machine elements are pointed out. To begin, the gradually sloped front surface of the front tines 17 and 17' along the ridges 22 and 22' presents the inclines up which the handset handle 32 must be drawn. The handle bearing against the front tines with a force equal to the angular component resulting from gravity at line 35 attempting to pull the handset housings 30 and 31 down along the decline shown by line 23 for one housing, of the curved side surfaces 18 and 18'. The force that moves the handset handle up and over the front tines is gravity applied by means of a lever action. The fulcrum for this lever is through the point on each of the transmitter and receiver housings that contacts the curved side surfaces 18 and 18' of the desk stand. The center of gravity at 35 at this time is to the rear of the fulcrum or contact points and thus causes the handle to move up the front tines 17 and 17'. The full lever is shown by points 35 for the motivating force, 24 and 37 for the fulcrum, and 17, 25 and 38 for the load on the one side of the housing, similar points being engaged on the other side of the housing simultaneously. The placement of the receiver housing 30 on the side shown 18 is typical, the action of the handset would remain the same if the handset were reversed to place the receiver housing on the other side 18'.

Figure 6:
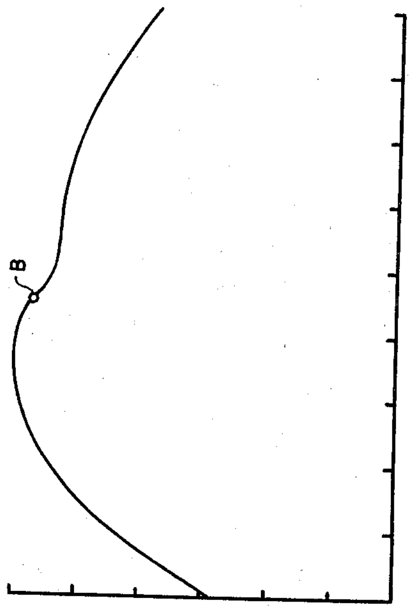
Fig. 6 is a graph showing the distance the handset handle rises during the restoring movement from the sloping front surface.

The path of the center or axis 34 of the handle 32 while it moves from a position A in front of the front tines to a position in the cradle C is shown in the graph in Fig. 6. This graph shows the distance the center of the handle rises to clear the tines plotted for increments of the distance the center of gravity falls.

With the described forces acting upon the handset in the manner directed by the configuration of the desk stand it is impossible for the handset handle to remain in front of the front tines when the transmitter and receiver housings are on the convexly curved side surfaces. The shaping, positioning, and spacing of the contours of the desk stand together with the weight distribution of the handset will always cause the handset to automatically seat in the cradle.

What is claimed is:

1. A telephone desk set comprising a handset and a casing having a cradle for seating said handset, said casing having a sloping front surface and side walls, said cradle formed by a pair of tines at the rear and a pair at the front, said front tines each having a ridge along the top which blends into the sloping front surface, said side walls having a sloping side surface which is substantially perpendicular to the front surface and which extends away from said front tines towards the rear, said ridge and said sloping side surfaces cooperating with said handset to restore the handset to the cradle when the handset is placed in front of the apex of said front tines and in engagement with said sloping side surfaces.

2. In a telephone set comprising a casing having side walls, a hand telephone having receiver and transmitter housings and a handle interconnecting said housings, a cradle on said casing for supporting said hand telephone, front and rear tines on said cradle, a curved surface on each of said side walls extending inwardly towards said cradle and downwardly at an angle, said curved surfaces being engaged by said receiver and transmitter housings when said handle of said hand telephone is placed in front of said front tines, and the weight of said handset and said downwardly extending angle of said curved surfaces causing said handle to rotate up and over said front tines to thereby automatically position said hand telephone in said cradle.

3. A telephone set comprising a casing, a hand telephone, a sloping front wall and side walls on said casing, receiver and transmitter housings and a handle interconnecting said housings forming said hand telephone, a pedestal having side walls on said casing, a cradle on top of said pedestal for supporting said hand telephone, front and rear tines on said cradle, said front tines having a predetermined curvature merging into said sloping front wall of said casing, curved surfaces on each of said side walls of said casing extending inwardly to the side walls of said pedestal, said curved surfaces having a predetermined curvature and shape such that when the hand telephone is placed with said handle of the hand telephone in front of said front tines the receiver and transmitter housings engage said curved surfaces on said casing side walls and the weight of the hand telephone causes said handle to rotate up and over said front tines and drop into said cradle.

4. A telephone desk set comprising a hand set with transmitter and receiver housings, a casing having a base and a pedestal portion with a cradle at the top of the pedestal portion forming a cradle seat for the hand set, front and rear tines defining said cradle seat, the front tines of the cradle forming a continuation, in the form of a gently curved surface, of the front surface of the base, convexly curved side surfaces on the sides of the base back of said front surface, said side surfaces forming guiding paths for the sides of the transmitter and receiver housings to guide said housings back and downward in such a manner as to raise the handle of the hand set over said front tines and into the cradle seat, when the hand set is wrongly placed with the handle engaging said front surface.

5. A telephone desk set comprising a casing having side walls, a hand telephone having receiver and transmitter housings and a handle interconnecting said housings, a cradle on said casing for supporting said hand telephone, front and rear tines on said cradle, a curved surface on each of said side walls extending inwardly towards said cradle and downwardly at an angle, said curved surfaces being engaged by said receiver and transmitter housings when said handle of said hand telephone is placed in front of said front tines, the weight of said handset and said downwardly extending angle of said curved surfaces causing said handle to rotate back, with the points of contact of said housings with said curved surfaces causing said rotation to bring said handle over said front tines into said cradle.

6. A telephone desk set comprising a casing and a telephone hand set, including a transmitter housing, a receiver housing, and a handle interconnecting said housings, vertical cradle walls on said casing, convex side surfaces on said casing extending from the front of said casing and gradually curving inwardly at a predetermined angular slope to said cradle side walls, a front surface on said casing sloping upwardly towards the top of said cradle walls and having sides conforming to the convex curvature of said convex side surfaces, a pair of front tines extending upwardly from and above said front surface and terminating an upper front portion of said cradle walls, cradle seats and a pair of rear tines terminating the remaining upper portion of said cradle walls, the weight and center of gravity of said handset and the angular slope of said side convex surfaces, cooperating to cause said handset to automatically seat itself into said cradle in response to manual placement of said handle in engagement with said front surface, and said housings in engagement with said angular slope of said convex side surfaces.

7. A telephone desk stand comprising a casing and a telephone handset; said casing including a base portion, a pedestal portion integrally formed on said base portion, and a cradle portion on top of said pedestal portion for receiving said handset; said base portion including vertically extending front and rear side walls, a front surface sloping upwardly and inwardly at a predetermined angle from said front wall to said cradle portion, and side surfaces each having a first curved side surface and a second curved side surface; each said first curved side surface convexly curving upwardly and inwardly from said side walls to form a horizontal line defining the base of said pedestal portion, each said second curved side surfaces extending from said front surface and curving inwardly to intersect said first curved side surface in a distinctive curved line and to meet said pedestal portion in a straight line extending at a predetermined angle substantially perpendicular to said front surface, said pedestal portion including a pair of side walls rising vertically from said horizontal and straight lines; said cradle portion including a pair of front tines, a pair of rear tines, and a cradle seat between said front and rear tines terminating the top of said pedestal side walls; a portion of each of said front tines being a continuation of said front surface and extending above said front surface and said cradle seat; said handset including a transmitter housing, a receiver housing, and a handle connecting said housings; the sloping angle of said second curved side surfaces and the weight of said handset causing said handle of said handset to move into said cradle seat in response to said handle being placed in engagement with said front surface and the receiver and transmitter housings being placed outside said pedestal side walls in engagement with said second curved side surfaces.

References Cited in the file of this patent

FOREIGN PATENTS

| | | |
|---|---|---|
| 131,975 | Austria | Sept. 15, 1932 |
| 707,767 | Great Britain | Apr. 21, 1954 |